United States Patent [19]

Hsu et al.

[11] 4,415,426

[45] Nov. 15, 1983

[54] ELECTRODES FOR ELECTRICAL COALESCENSE OF LIQUID EMULSIONS

[75] Inventors: Edward C. Hsu, Bridgewater; Norman N. Li, Edison; Taras Hucal, Iselin, all of N.J.

[73] Assignee: Exxon Research and Engineering Co., Florham Park, N.J.

[21] Appl. No.: 286,875

[22] Filed: Jul. 27, 1981

Related U.S. Application Data

[63] Continuation-in-part of Ser. No. 192,560, Sep. 30, 1980, abandoned.

[51] Int. Cl.$^3$ .................... C25B 11/00; C10G 33/02
[52] U.S. Cl. ............................ 204/290 R; 204/302
[58] Field of Search .................... 204/186–191, 204/280, 302–308, 290 R

[56] References Cited

U.S. PATENT DOCUMENTS

| 2,364,118 | 12/1944 | Wolfe ................................ 204/188 |
| 3,839,176 | 10/1974 | McCoy et al. ...................... 204/191 |
| 3,891,528 | 6/1975 | Griswold ............................ 204/186 |
| 4,073,712 | 2/1978 | Means et al. .................... 204/302 X |
| 4,283,290 | 8/1981 | Davies ............................ 204/191 X |

Primary Examiner—Donald R. Valentine
Attorney, Agent, or Firm—Edward M. Corcoran

[57] ABSTRACT

Improved electrodes for electrically coalescing water-in-oil emulsions in an AC electrical field, wherein the improvement comprises insulated electrodes having a dielectric constant of at least about 3 and a hydrophobic surface in contact with the emulsion. This invention results in faster coalescense of emulsions than can be obtained with insulated electrodes having a lower dielectric constant even if the surface of the electrode at the electrode-emulsion interface is hydrophobic. Formation of spongy emulsion and decomposition of the oil phase under the high voltages required for rapid coalescense is minimized and even eliminated.

5 Claims, 4 Drawing Figures

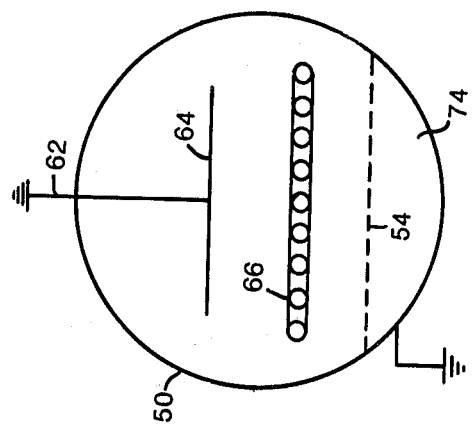
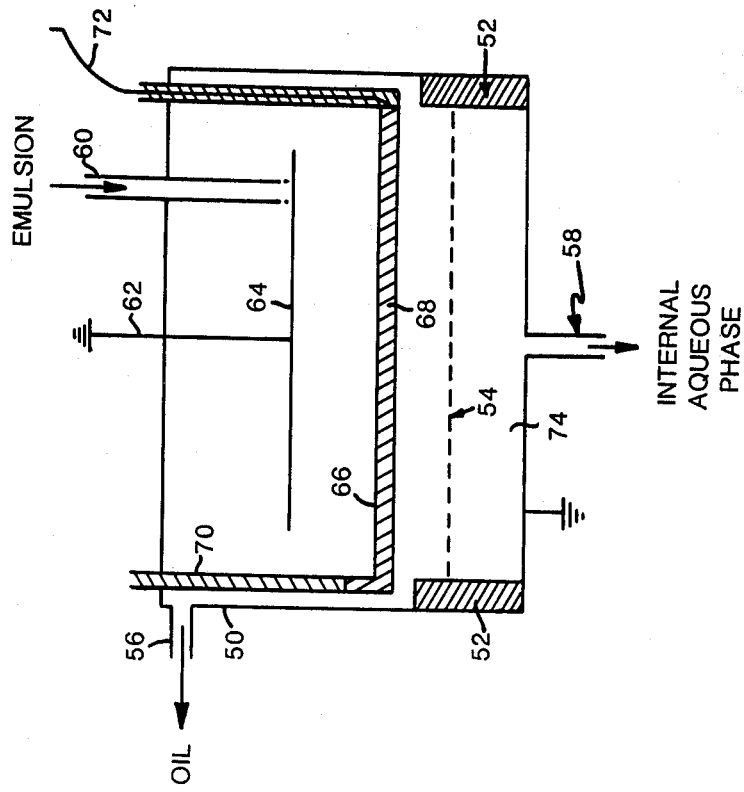
FIG.1B
FIG.1A

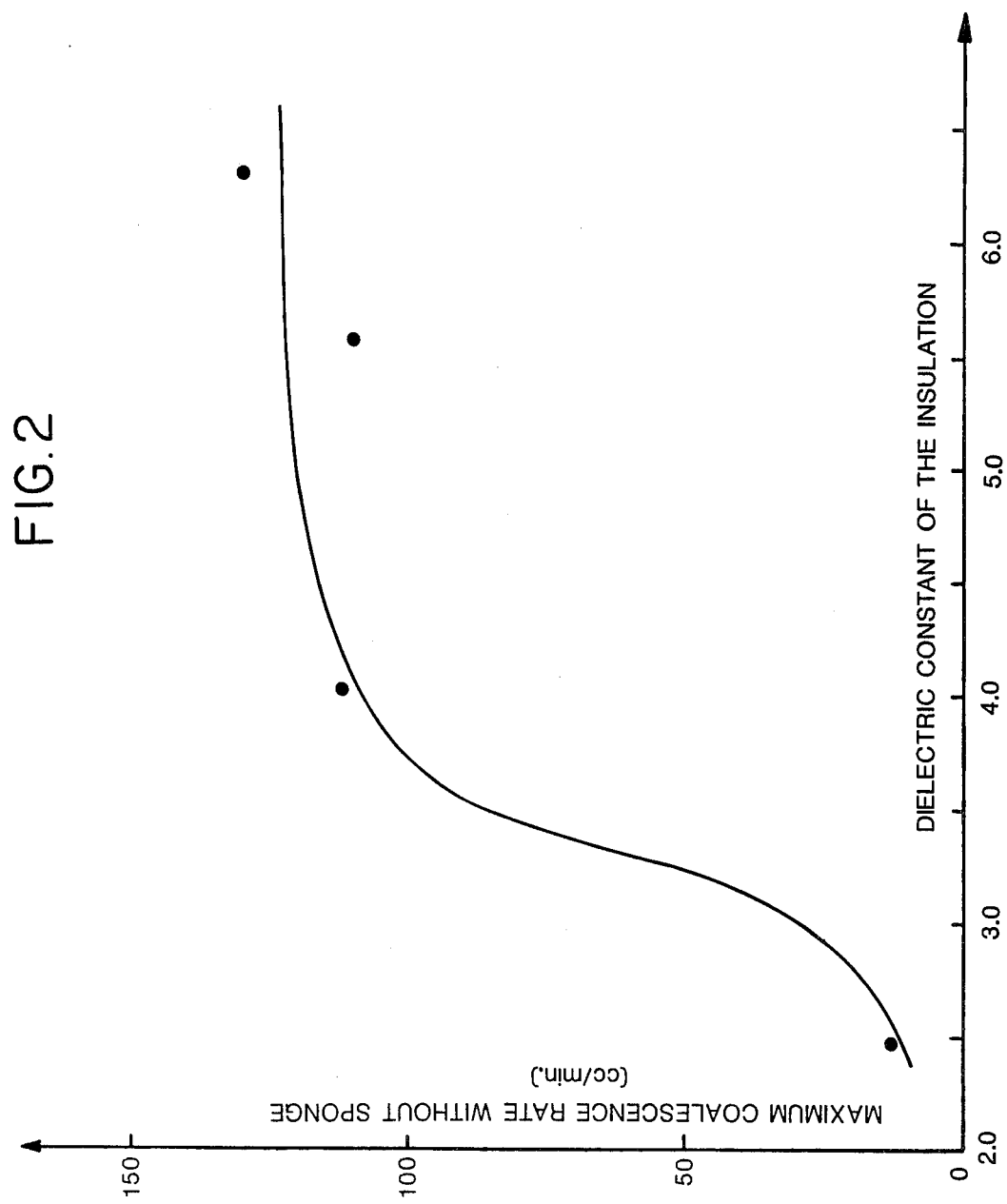

ELECTRODES FOR ELECTRICAL COALESCENSE OF LIQUID EMULSIONS

This is a continuation-in-part of application Ser. No. 192,560, filed Sept. 30, 1980, now abandoned.

BACKGROUND OF THE INVENTION

1. Field of the Invention

This invention relates to improved electrodes for electrically coalescing emulsions. More particularly, this invention relates to improved insulated electrodes for electrically coalescing water-in-oil emulsions in an AC electrical field. Still more particularly, this invention relates to improved electrodes for coalescing water-in-oil emulsions in an AC electrical field employing an insulated electrode wherein the improvement comprises an insulated electrode having a dielectric constant above about 3 and a hydrophobic surface at the electrode-emulsion interface in the coalescing zone.

BACKGROUND OF THE DISCLOSURE

It is well-known in the art to electrically coalesce emulsions in alternating electrical fields, particularly in connection with naturally-occurring water-in-oil emulsions such as in dehydrating crude oils. It is also known to employ insulated electrodes in these processes in order to minimize or avoid short-circuiting of the electric field. Thus, U.S. Pat. Nos. 2,946,753; 2,539,074; 2,364,118; 1,838,924; 1,838,376; and 1,170,184 relate to electrodes that are electrically insulated from the emulsion. U.S. Pat. No. 2,364,118 employs an insulated electrode in contact with the emulsion wherein the insulated electrode is connected to the high voltage portion of a transformer, with ground being the coalesced aqueous phase at the bottom of the apparatus. U.S. Pat. No. 2,470,741 relates to agitating a naturally occurring water-in-oil crude oil emulsion in an electrostatic coalescer in order to minimize short-circuiting and reduced resistance caused by masses of demulsified water which are formed between the high voltage electrode and the ground. U.S. Pat. Nos. 3,905,891 and 3,926,774 relate to heating the emulsion in an electrostatic coalescer or coalescing zone, while U.S. Pat. Nos. 3,410,794 (No. Re. 27,888) and 3,454,489 (No. Re. 28,002) disclose that electrostatic coalescense may be employed to break man-made emulsions of the liquid membrane type. Finally, Netherlands application No. 6,514,388 discloses employing polyethylene or polypropylene insulated electrodes for dehydrating jet fuel while U.S. Pat. No. 3,839,176 employs teflon insulated electrodes for demulsifying water-in-oil emulsions.

Man-made emulsions of the liquid membrane type are much more stable and substantially different from natural occurring emulsions such as salt water-containing crude oils. These man-made emulsions are physically different because of the large amount of aqueous phase which can exceed 30% of the total emulsion. These emulsions are very stable and resistant to coalescence, because of the presence of surfactants and emulsion stabilizers. Also, these emulsions generally have to be coalesced in a manner so as to minimize decomposition of the oil phase and to insure that the coalesced internal phase contains little or practically no trace of oil or surfactant. Therefore, the use of electrostatic coalescence for liquid membrane emulsions can be substantially different from that conventionally practiced in fields such as crude oil desalting.

When one attempts to follow the prior art methods conventionally practiced to coalesce naturally-occurring water-in-oil emulsions, such as a desalting crude oil, the liquid membrane emulsions coalesce at a unsatisfactorily slow rate and the aqueous internal phase tends to coalesce as large droplets which fall to the bottom of the coalescer and pile up to form a layer of viscous, sponge-like emulsion, containing as much as 4% of the surfactant-containing oil phase, (known in the art as spongy emulsion) instead of as a clear, continuous layer of aqueous internal phase. Increasing the voltage applied to the electrodes in the coalescer will reduce the formation of spongy emulsion, but with man-made emulsions the voltage required is so high that sparking occurs which short-circuits the electric field and breks down the oily phase of the emulsion to form bubbles of hydrocarbon gas. Thus, it would be an improvement to the art if a way could be found to efficiently and rapidly electrostatically coalesce emulsions, particularly man-made emulsions, without incurring either breakdown of the electric field or the formation of spongy emulsion.

SUMMARY OF THE INVENTION

It has now been found that the disadvantages associated with the processes of the prior art are avoided if at least one of the electrodes used in the coalescing zone are insulated with both a dielectric constant of at least about 3 and a hydrophobic surface at the interface of the insulation and the emulsion. Using insulated electrodes having both a dielectric constant of at least about 3 and a hydrophobic surface in the coalescing zone permits the use of higher voltages with concomitant faster coalescense of the emulsion without sparking or short-circuiting and without either decomposition of the oil or the formation of spongy emulsion. Thus, the present invention is an improved electrode for electrically coalescing emulsions in a coalescing zone containing one or more insulated electrodes wherein the improvement comprises an insulated electrode wherein the insulation has a dielectric constant of at least about 3 and wherein the surface of the electrode is hydrophobic at the electrode-emulsion interface. By hydrophobic is meant a surface that is not wet by water and which has a free energy of less than about 75 dynes/cm and more preferably, less than about 40 dynes/cm. The electrodes of this invention are particularly useful for breaking the extremely stable and difficult to demulsify synthetic emulsions of the type disclosed in U.S. Pat. No. 3,779,907, the disclosures of which are incorporated herein by reference. These emulsions are referred to by those skilled in the art as liquid membrane emulsions.

The AC electrical field in the coalescing zone is determined by the applied voltage and inter-electrode space between at least two cooperating electrodes. In this invention, at least one of the cooperating electrodes must be insulated with insulation having a dielectric constant of at least about 3 and the electrode must have a hydrophobic surface at the interface of the electrode and emulsion. In a particularly preferred embodiment of this invention, coalesced internal aqueous phase of the emulsion will exist as a layer on the bottom of the coalescing zone and will be electrically grounded to form one of the two or more cooperating electrodes and the AC frequency will be between from about 60 to 1,000 Hz. At least one other cooperating electrode will comprise an insulated electrode having a dielectric constant of at least about 3 and a hydrophobic surface positioned in the coalescing zone above the coalesced aqueous layer in contact with the emulsion. Thus, in this embodiment, a vertical AC field having a frequency of from about 60 to 1,000 Hz will exist between the insulated electrode or electrodes and the grounded aqueous layer at the bottom of the coalescing zone. By using the electrode of this invention one can operate at voltages up to the limit allowed by the electrode insulation without incurring sparking, degradation of the oil or formation of sponge emulsion.

By insulation is meant a solid dielectric medium having a dielectric constant of at least about 3 and preferably at least about 3.5 and more preferably at least about 4 in at least one portion of the AC inter-electrode field space adjacent to at least one of the cooperating electrodes. Illustrative, but non-limiting examples of suitable solid dielectric mediums includes various inorganic and organic materials such as glass, quartz, ceramics, various refractory metal oxides, etc., and various rubbers and plastics having the required dielectric constant. The insulation may also be a composite or layered structure of two or more such materials. The insulation should also have an electrical breakdown strength sufficient to withstand the voltages used and should have low capacitive impedance.

The required hydrophobicity may be inherent in the insulation material or it may be achieved by coating or covering the insulated electrode with a suitable material having a surface free energy below about 75 dynes/cm and more preferably below about 40 dynes/cm. Such materials are well known in the art. An illustrative, but non-limiting list of suitable materials is as follows.

|  | Surface Free Energy dynes/cm |
|---|---|
| polyhexafluoropropylene | 16 |
| polytetrafluoroethylene | 18.5 |
| poly(hexafluoropropylene-CO—tetrafluoroethylene) | 16–19 |
| polyalkylsiloxane | 24–30 |
| polyethylene | 31 |
| polypropylene |  |
| polystyrene | 33 |
| polyvinyl chloride | 40 |

The fluoropolymers are particularly preferred as hydrophobic coating materials because of their low surface free energy and chemical inertness. Also, various surfaces may be treated with silanes such as alkoxysilanes which will result in a surface having a surface free energy of about 35 dynes/cm. It should be noted that the hydrophobic surface modification of the insulated electrode can be of a thickness of molecular dimensions (i.e., coating a glass insulated electrode with an alkoxysilane).

BRIEF DESCRIPTION OF THE DRAWINGS

FIG. 1 is a schematic illustration of a continuous laboratory coalescing apparatus used and described in detail in Example 1.

FIGS. 2 and 3 are graphs illustrating emulsion coalescence rate as a function of the dielectric constant of the electrode insulation.

EXAMPLES

Figure 3:
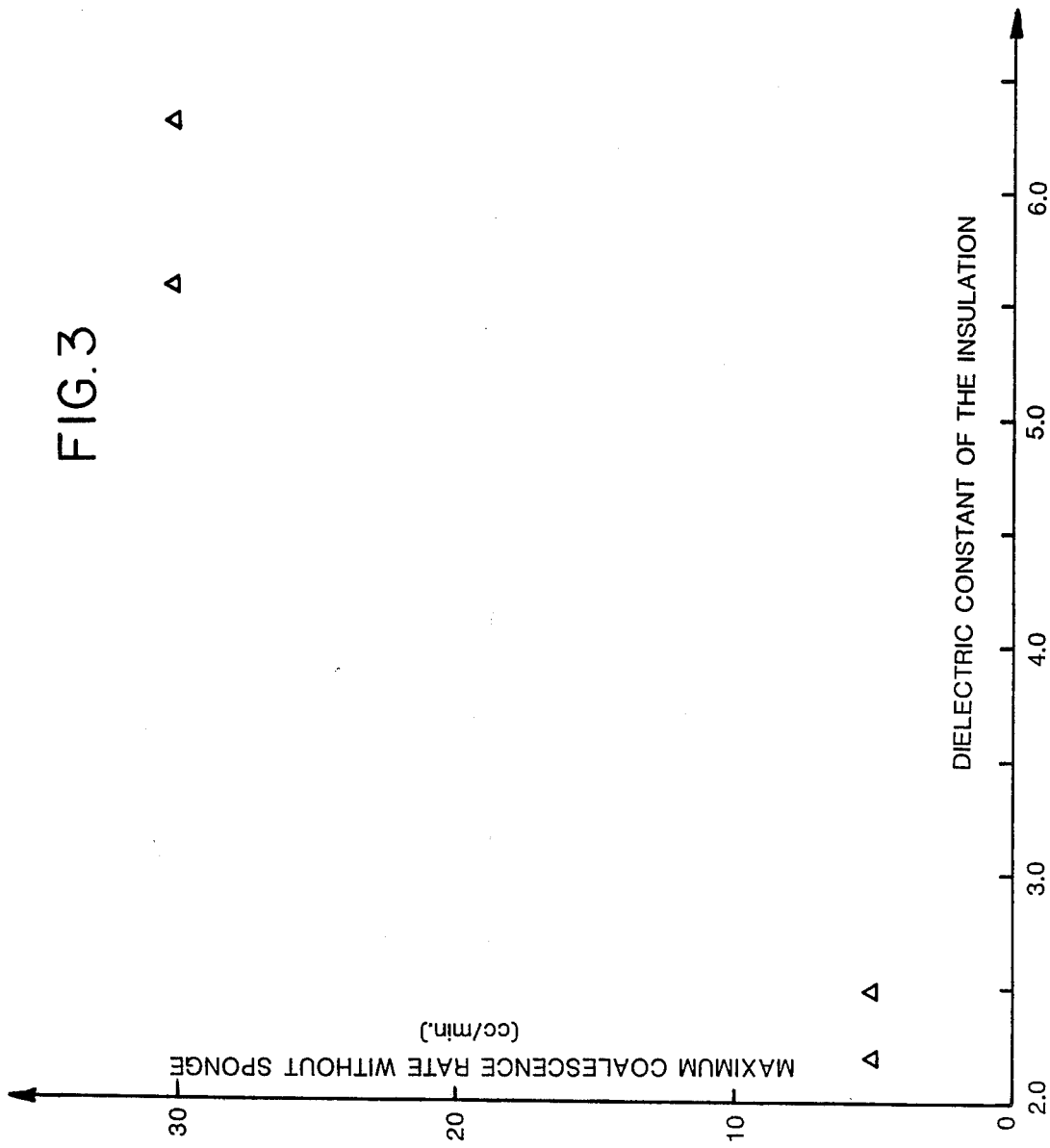

The invention will be more readily understood by referring to the examples below.

EXAMPLE 1

In this example, a continuous, one-gallon capacity laboratory coalescer schematically illustrated in FIG. 1 was employed. Referring to FIG. 1($a$), the coalescer comprised a round, Plexiglass cylinder 50 of one gallon capacity fitted with Plexiglass end plates 52 at the bottom. Drum 50 was fitted with pipes 56 and 58 for removal of the coalesced oil and internal aqueous phase, respectively. Pipe 60 was used to feed emulsion into the coalescer. Ground wire 62 was connected to a flat, 10 mesh stainless wire cloth 64 (3"×6") inside the coalescer. Electrode 66 comprised a piece of Pyrex tubing 7 mm O.D. and 5 mm I.D. bent into a grid 4 ½"×8". Two such electrodes were made. One was uncoated so that it possessed a hydrophillic surface. The external surface of the other electrode grid was coated with a $5 \times 10^{-3}$ inch thick coating of fluorinated ethylene-propylene copolymer (FEP) to give it a hydrophobic surface having a surface free energy of from about 16–19 dynes/cm. Both electrodes had a dielectric constant of 5.58 at 60 Hz. The inside of electrode 66 was filled with electrolyte 68 and topped off with oil 70. Electrical conductor 72 was inserted into electrode 66 so that it made electrical contact with electrolyte 68. Conductor 72 was then connected to the output terminal of a high voltage transformer. FIG. 1($b$) is a schematic end view of 1($a$) and illustrates the spatial relationship between insulated electrode 66 and ground electrodes 64 and 74, electrode 74 being the layer of aqueous internal phase of the emulsion. The interelectrode distance was about 1 inches between electrodes 66 and 64 and about ¾ inches between electrode 74 and electrode 66, the distance between electrode 74 and insulated electrode 66 being determined, of course, by the oil/aqueous phase interface 54.

To operate the continuous coalescer, the coalescer is filled up with both the oil and aqueous component of the emulsion it is desired to coalesce, with the amount of oil and aqueous material used determined by the interface level 54 desired. The desired voltage is applied to conductor 72 and the emulsion is fed into the coalescer via pipe 60 at the rate required to maintain the desired oil aqueous phase interface level.

In this experiment the oil phase of the emulsion comprised 3 wt. % ECA-4360 (a polyamine surfactant made by Exxon Chemical Company), 2.9 wt. % of di(2-ethylhexyl) phosphoric acid and 0.88 wt. % trioctylphosphine oxide in a light oil paraffinic solvent available from Exxon Chemical Company as LOPS. The aqueous, internal phase was a solution of 149 g $FeSO_4$ in one (1) liter of 6M $H_3PO_4$. The water-in-oil emulsion was prepared by blending two parts by volume of oil phase to one part by volume of internal aqueous phase in a Waring blender to form a milky emulsion. The results obtained using the hydrophilic and hydrophobic surface electrodes are given in Table 1.

TABLE 1

|  | Hydrophillic Electrode | Hydrophobic Electrode | | |
|---|---|---|---|---|
| Voltage[a] | 8KV | 8KV | 15KV | 25KV |
| Sparking | (8.5KV) | none | none | none |
| Max. coalescence | 40 | 40 | 150 | 450 |

TABLE 1-continued

|  | Hydrophillic Electrode | Hydrophobic Electrode |
|---|---|---|
| Rate, cc/min[b] |  | 5 |

Notes:
[a]60 Hz.
[b]Maximum coalescence rate obtainable without incurring the formation of spongy emulsion.

These results significantly illustrate the invention. That is, a high dielectric constant alone is not enough. The electrode must have both a high dielectric constant and a hydrophobic surface.

The uncoated electrode started sparking or short circuiting at an applied voltage of only 8.5 KV and at 8 KV could coalesce only 40 cc/min of emulsion without forming spongy emulsion. The coalescer did not operate at 15 KV with the hydrophillic electrode due to an extremely large amount of gasing. Also, the oil quickly turned a very dark color.

In marked contrast to this, the insulated electrode with the hydrophobic surface didn't spark at voltages as high as 25 KV and coalesced the emulsion at significantly greater rates without forming spongy emulsion.

EXAMPLE 2

This experiment used the same kind of emulsion and apparatus as that used in Example 1, excpet that in this experiment the coalescer was smaller in size and the insulated electrode was made of seven, 4 inch long tubes, instead of being made of a single, long run of tubing bent into a grid shape as in Example 1. Also, the emulsion was somewhat aged which made it easier to coalesce. In three runs the insulated electrode was tubing filled with an electrolyte, while in the fourth run it was a PVC insulated wire coated with 0.15 mm of PVF$_2$ (polyvinylidene fluoride).

The data are given in Table II and FIG. 2 is a graph of the emulsion coalescense rate as a function of the dielectric constant of the electrode insulation. It should be noted that the surface of all of the electrodes was hydrophobic. FIG. 2 clearly illustrates that there is a critical value for the dielectric constant of the insulation in the region of about 3 to 4.

EXAMPLE 3

This experiment used the same type of emulsion and the same apparatus employed in Example 2, except that the emulsion was freshly made which made it harder to coalesce. Four runs were made, each with a different electrode. The results are given in Table III and the emulsion coalescense rate as a function of the dielectric constant of the electrode insulation is shown in FIG. 3. These results are cumulative in establishing the existence of a critical value for the dielectric constant of the electrode insulation.

TABLE II

|  | Run No. | | | |
|---|---|---|---|---|
|  | 1 | 2 | 3 | 4 |
| Electrode insulation conductor | 1.15 mm polypropylene electrolyte | 0.9 mm Lucite electrolyte | 1.0 mm silate treated glass electrolyte | 1.5 mm PVC coated with 0.15 mm PVF$_2$ Cu wire |
| Dielectric constant, 60Hz | 2.49 | 3.89 | 5.58 | 6.3 |
| 1Khz | 2.49 | 3.44 | 5.19 | 5.1 |
| Applied voltage, 60 Hz | 15KV | 15KV | 15KV | 15KV |
| Maximum coalescense rate without formation of spongy emulsion | <15 cc/min. | 112 cc/min. | 110 cc/min. | 130 cc/min. |

TABLE III

| Electrode and Performance | | | | |
|---|---|---|---|---|
| Conductor | Electrolyte | Electrolyte | Electrolyte | Cu-Wire |
| Insulation Material | *FEP Coated Glass | Polypropylene Tubing | Teflon Tubing | PFV$_2$ Coated on PVC |
| Dielectric Constant | 5.58 | 2.49 | 2.2 | 6.3 |
| Insulation Thickness | 1 mm | 1 mm | 1 mm | 1 mm |
| Electrode Construction | 7 Tubes, Each 4" Long | Same | Same | 11 Tubes Each 3.2" Long |
| Conductor Surface Area | 110 Cm$^2$ | 100 Cm$^2$ | 100 Cm$^2$ | 92 Cm$^2$ |
| Electrode Coverage Area | 87 Cm$^2$ | 87 Cm$^2$ | 87 Cm$^2$ | 87 Cm$^2$ |
| Applied Voltage | 13–15 KV | 15 KV | 15 KV | 15 KV |
| Coalescense Rate | 30 cc/Min. | ≦5 cc/Min. | ≦5 cc/Min. | 30 cc/Min. |

Note:
*Fluorinated ethylele propylene

What is claimed is:

1. An apparatus for coalescing a water-in-oil emulsion in an AC electric field in a coalescing zone between two or more cooperating electrodes wherein at least one electrode is an insulated electrode comprising an electrically conductive material insulated with a solid dielectric having both a dielectric constant of at least about 4 and a hydrophobic surface.

2. The apparatus of claim 1 wherein one of said cooperating electrodes comprises an aqueous layer of coalesced aqueous phase of said emulsion.

3. The apparatus of either of claims 1 or 2 wherein said insulation comprises a composite of two or more materials.

4. An insulated electrode for use in coalescing water-in-oil emulsions comprising an electrically conductive material insulated with a solid dielectric having both a dielectric constant of at least about 4 and a hydrophobic surface.

5. The electrode of claim 4 wherein said insulation comprises a composite of two or more materials.

* * * * *